US009203097B2

(12) United States Patent
Martinchek et al.

(10) Patent No.: US 9,203,097 B2
(45) Date of Patent: Dec. 1, 2015

(54) DISCRETELY SUPPORTED WET SIDE PLATES

(75) Inventors: David A. Martinchek, Spencerport, NY (US); Thomas D. Bronchetti, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 939 days.

(21) Appl. No.: 13/353,744

(22) Filed: Jan. 19, 2012

(65) Prior Publication Data

US 2013/0022897 A1    Jan. 24, 2013

Related U.S. Application Data

(60) Provisional application No. 61/434,569, filed on Jan. 20, 2011.

(51) Int. Cl.
| | |
|---|---|
| *H01M 8/24* | (2006.01) |
| *B01F 3/04* | (2006.01) |
| *H01M 8/02* | (2006.01) |
| *H01M 8/04* | (2006.01) |
| *H01M 8/10* | (2006.01) |

(52) U.S. Cl.
CPC .......... *H01M 8/0267* (2013.01); *H01M 8/0228* (2013.01); *H01M 8/04291* (2013.01); *H01M 2008/1095* (2013.01); *Y02E 60/50* (2013.01); *Y10T 156/1026* (2015.01); *Y10T 156/1089* (2015.01)

(58) Field of Classification Search
None
See application file for complete search history.

(56) References Cited

U.S. PATENT DOCUMENTS

| | | | |
|---|---|---|---|
| 8,091,868 B2 * | 1/2012 | Robb et al. | 261/101 |
| 8,657,266 B2 * | 2/2014 | Brenner et al. | 261/100 |
| 2009/0092863 A1 | 4/2009 | Skala | |
| 2010/0019400 A1 | 1/2010 | Robb et al. | |

* cited by examiner

*Primary Examiner* — Tracy Dove
(74) *Attorney, Agent, or Firm* — Dinsmore & Shohl LLP

(57) ABSTRACT

A water vapor transfer separator plate assembly and a method of making the same. In such an assembly made up of a stack of alternating wet side plates and dry side plates with a membrane disposed between them, a humid fluid such as that found in a fuel cell cathode exhaust flows against one side of each membrane such that at least some of its moisture content travels across the membrane to a lower humidity fluid on the opposite side of the membrane. The lower humidity fluid, such as that found in a fuel cell cathode entrance, experiences an increase in its humidity by the operation of the moisture flow across the membrane. At least a portion of the assembly may be made thinner by removing diffusion media and reinforcing structure of the dry side plates such that the overall assembly is simplified.

10 Claims, 5 Drawing Sheets

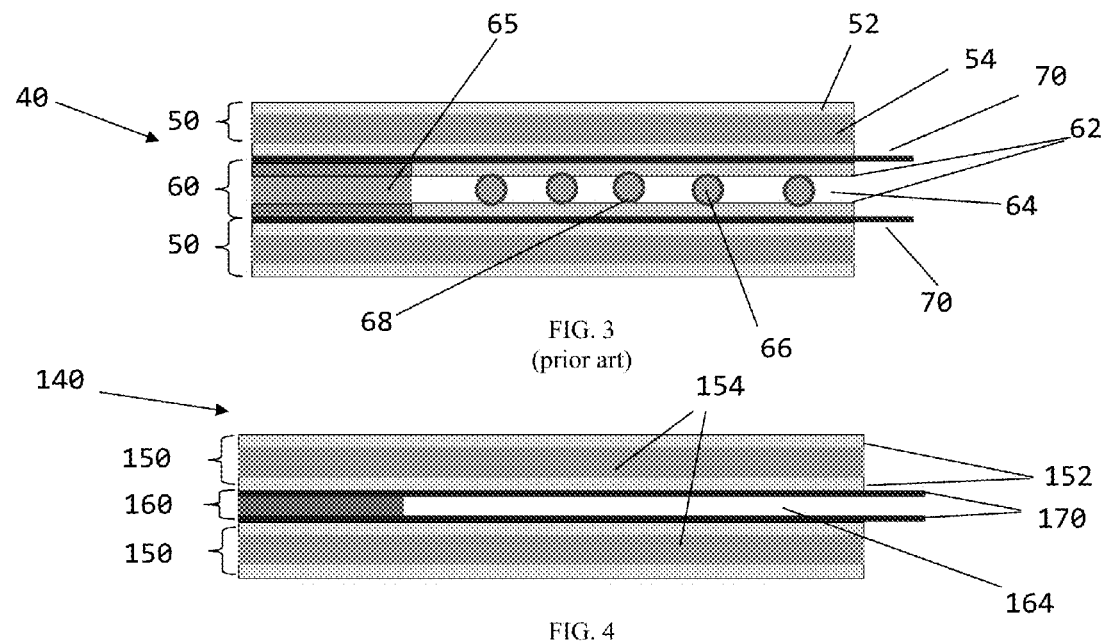
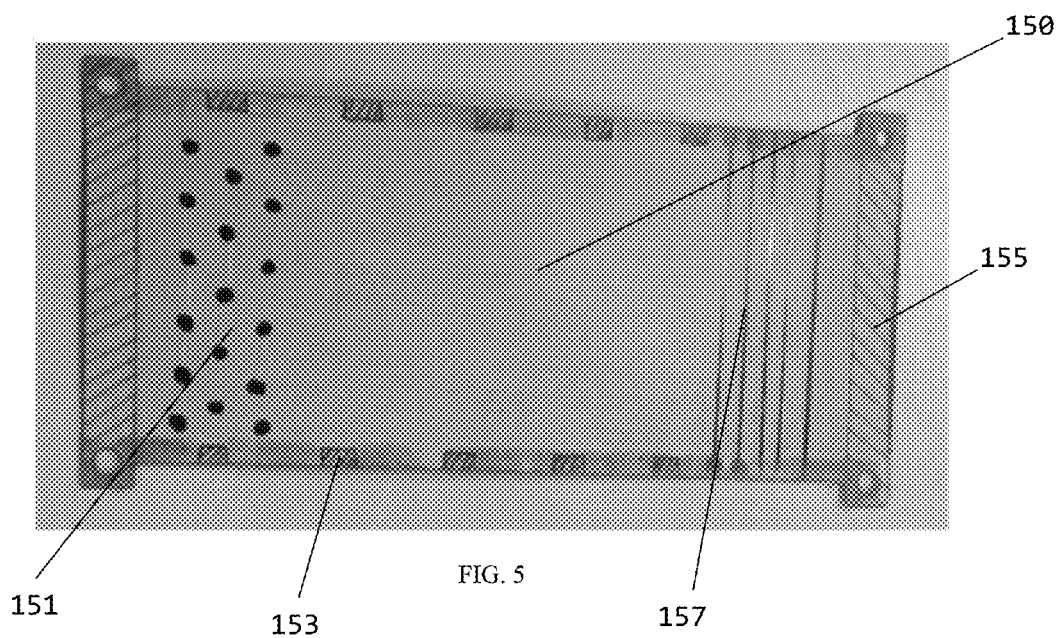

DISCRETELY SUPPORTED WET SIDE PLATES

This application claims the benefit of the filing dates of U.S. Provisional Application No. 61/434,569, filed Jan. 20, 2011.

BACKGROUND OF THE INVENTION

This invention relates generally to a way to improve the transfer of water vapor produced by a fuel cell, and more particularly to an improved water vapor transfer (WVT) separator plate assembly and a method for making such an assembly.

In many fuel cell systems, hydrogen or a hydrogen-rich gas is supplied through a flowfield to the anode side of a fuel cell while oxygen (such as in the form of atmospheric oxygen) is supplied through a separate flowfield to the cathode side of the fuel cell. An appropriate catalyst (for example, platinum) is typically disposed as a layer on porous diffusion media that is typically made from a carbon fabric or paper such that it exhibits resiliency, electrical conductivity, and gas permeability. The catalyzed diffusion media is used to facilitate hydrogen oxidation at the anode side and oxygen reduction at the cathode side. An electric current produced by the dissociation of the hydrogen at the anode is passed from the catalyzed portion of the diffusion media and through a separate circuit such that it can be the source of useful work, while the ionized hydrogen passes through the MEA to combine with ionized oxygen at the cathode to form high temperature water vapor as a reaction byproduct. In one form of fuel cell, called the proton exchange membrane or polymer electrolyte membrane (in either event, PEM) fuel cell, an electrolyte in the form of a perfluorinated sulfonic acid (PFSA) ionomer membrane (such as Nafion®) is assembled between the diffusion media of the anode and cathode. This layered structure is commonly referred to as a membrane electrode assembly (MEA), and forms a single fuel cell. Many such single cells can be combined to form a fuel cell stack, increasing the power output thereof.

Fuel cells, particularly PEM fuel cells, require balanced water levels to ensure proper operation. For example, it is important to avoid having too much water in the fuel cell, which can result in the flooding or related blockage of the reactant flowfield channels, thereby hampering cell operation. On the other hand, too little hydration limits the electrical conductivity of the membrane and can lead to premature cell failure. Exacerbating the difficulty in maintaining a balance in water level is that there are numerous conflicting reactions taking place in a fuel cell that are simultaneously increasing and decreasing local and global hydration levels.

One method of ensuring adequate levels of hydration throughout the fuel cell includes humidifying one or both of the reactants before they enter the fuel cell. For example, the water produced at the cathode can be used, with an appropriate humidification device, to reduce the likelihood of dehydration of the anode or the PFSA ionomer membrane. One example of such a humidification device is a WVT unit (also referred to as a membrane humidifier) that extracts the moisture from a humid fuel cell flowpath (also referred to as a flow channel) and places it into a feedpath used to convey a reactant low in humidity. This is generally accomplished by using a WVT membrane that is disposed between adjacent high humidity and low humidity fluids. The membrane allows water vapor to pass through it from the higher humidity fluid to the lower humidity fluid while inhibiting the undesirable direct passage of inlet gases from the low humidity fluid to the outlet containing high humidity fluid without having first passed through the fuel cell. In one form of construction, this membrane may be attached to a diffusion media layer (also called a gas diffusion media (GDM)) that is generally similar (with the exception of the catalyst layer) to the diffusion layer of the MEA discussed above. Such a membrane and diffusion media layer combination may be referred to as a separator, a separator plate, or a membrane humidifier assembly. Numerous such separator plates may be stacked together such that alternating layers facilitate the respective passages of the dry and humid fluids. In one form, a WVT unit is made up of alternating layers of wet side separator plates (also called wet side plates) and dry side separator plates (also called dry side plates).

It is known to manufacture a WVT separator assembly made up of a plastic plates with integral flow channels, where the gas diffusion and membrane layers are attached to the plastic plate using pressure sensitive adhesive (PSA). Such an approach is time consuming and costly to manufacture, repair or replace. Furthermore, use of a plastic plate increases the overall dimensions of the separator plate.

An exemplary membrane humidifier for a fuel cell system that does not involve a plastic plate is disclosed in U.S. Published Patent Application 2009/0092863 to Skala, which is owned by the Assignee of the present invention and is hereby incorporated by reference in its entirety. The device depicted in that application describes a membrane humidifier assembly for a WVT unit having top and bottom layers formed from a diffusion medium that is in turn formed from a glass fiber impregnated with an uncured resin. An array of substantially planar elongate ribbons is disposed between the top and bottom diffusion medium layers to provide reinforcement of, and maintain separation between, the top and bottom layers. While the Skala system resolves many of the shortcomings of previous WVT separator plate designs, it would be desirable to further reduce the overall size, weight and complexity of a WVT unit using a stack of separator plate assemblies.

SUMMARY OF THE INVENTION

According to an aspect of the present invention, a separator plate assembly can be made thinner, lighter and simpler to achieve an efficient transfer of water vapor between adjacent flowfields in a WVT device in order to provide humidification of the WVT dry side. The assembly may include a pair of wet side separators (or separator plates) spaced apart from one another. A pair of WVT membranes are placed on or adjacent to the outer surfaces of the pair of wet side separators such that the membranes face each other to define a dry side flow channel between them. Spacing members positioned between the facing surfaces of the pair of WVT membranes define the thickness of a dry side region between adjacent wet side separator plates. By such construction, the channel that is formed in place of the conventional dry side plate has a thickness defined substantially by the spacing members, rather than by the conventional string and additional diffusion media. Thus, even if additional support structure is present in the dry side flow channel, they do not contribute to an increase in dry side flow channel thickness beyond that established by the spacing members. Moreover, the presence of the wet side WVT membranes defining the opposing top and bottom (or side to side, depending on the fuel cell orientation) surfaces of the dry side flow channel mean that redundant membrane structure is absent or eliminated, which further contributes to fuel cell thickness and part count. In one preferred form, the spacing members may be in the form of strips placed along opposing edges along the direction of reactant flow.

According to another aspect of the present invention, a method of making the various plates of such a separator plate assembly can be used to fabricate simpler, lighter weight, lower cost WVT units. The method includes providing a pair of wet side separators having first and second surfaces, applying a WVT membrane to the first surface of the pair of wet side separators, applying edge strips positioned on opposing edges of a surface of at least one of the WVT membranes; and laminating the pair of wet side separators with the WVT membranes facing each other. In this way, the edge strips positioned between the pair of WVT membranes define a substantial entirety of the thickness of a flow channel formed between the pair of water vapor transfer membranes.

As discussed in conjunction with at least the above aspects of the present invention, a separator plate assembly can be made without the traditional dry-side separator plate, which can be replaced with spacers at the edges, as well as optional intermittent (i.e., discrete) support locations over the plate surface. The configuration resembles multiple wet side plates stacked so that between each adjacent stacked plate or layer is a thin dry side flow region formed by the edge spacers and the discrete supports between adjacent wet side plates. Membranes situated between the wet side and dry side flow fields allow the passage of the humidity from the former to the latter.

The spacers and discrete supports, coupled with the relatively balanced pressure on opposite sides of the wet side separators (due, for example, to the relatively uniform incoming dry side air pressure from the cathode-feeding compressor) are sufficient to avoid fluttering and related vibratory phenomena that might otherwise occur during operation of the WVT unit. In addition, the discrete supports ensure uniform spacing between plates resulting in evenly distributed dry side mass flow throughout the WVT stack.

The WVT assembly can be manufactured using a process that eliminates plate stacking operations while producing a finished product, if desired. A roll-based process may be used which facilitates continuous formation of the wet side separator plates, where a stack is comprised of a continuous roll good which is pleated and Z-folded, for example. In one form, the removal of dry side plates results in a significant reduction in dry side flow channel height compared to a conventional "paper and string" plate configuration or a plastic plate configuration. The present inventors have discovered that up to about a 67% reduction in dry side flow channel height in the gap between successive wet side plates can be achieved by replacing the "paper and string" dry side plate with the approach of the present invention or up to about 75% for the plastic plate configuration.

The WVT assembly with the discretely supported wet side plates can have one or more of the following benefits. In some embodiments, the WVT assembly can have improved water transfer rate performance, where for example increases of about 5% at low flows and about 25% at high flows in prototype WVT assemblies have been demonstrated. This allows for reduction in membrane active area required and a concomitant reduction in the number of separator assemblies. Thus, the WVT assembly can be lower cost due to one or more of (1) eliminating membrane active area (and associated plate count), (2) eliminating dry side separator assembly components and (3) stacking the WVT core as part of the separator assembly production process. The WVT assembly can have lower mass because of the elimination of the dry side separator assembly components (for example, 3.4 grams per dry side separator assembly, which could be about 350 grams per core (depending on the number of wet and dry side assemblies in the WVT assembly), or about 13.5% of 2.6 kilogram target). The WVT assembly could have a lower part count as a result of eliminating dry side assembly parts (for example, about ten thousand pieces per core for dry side plates that employ a two-piece GDM with 87 strings). The WVT assembly can have a reduced dry side channel height (for example, about 400 microns reduction per cell or 40 millimeters on WVT core containing one hundred dry side flow channels, or an equivalent reduction of footprint instead, if desired. The WVT assembly can have a reduced dry side flow channel height variation due to the elimination of the two pieces of GDM previously contained in the dry side plate.

BRIEF DESCRIPTION OF THE DRAWINGS

The following detailed description of specific embodiments can be best understood when read in conjunction with the following drawings, where like structure is indicated with like reference numerals and in which:

FIG. 3 shows an edge-on view of a three-plate separator plate assembly section of the WVT of FIG. 2;

FIG. 4 shows an edge-on view looking along the dry side flow channels of a comparable section of a separator plate assembly made up of wet side plates according to an aspect of the present invention;

FIG. 5 shows various possible discrete support configurations for a wet side plate;

DETAILED DESCRIPTION OF THE PREFERRED EMBODIMENTS

Figure 1:
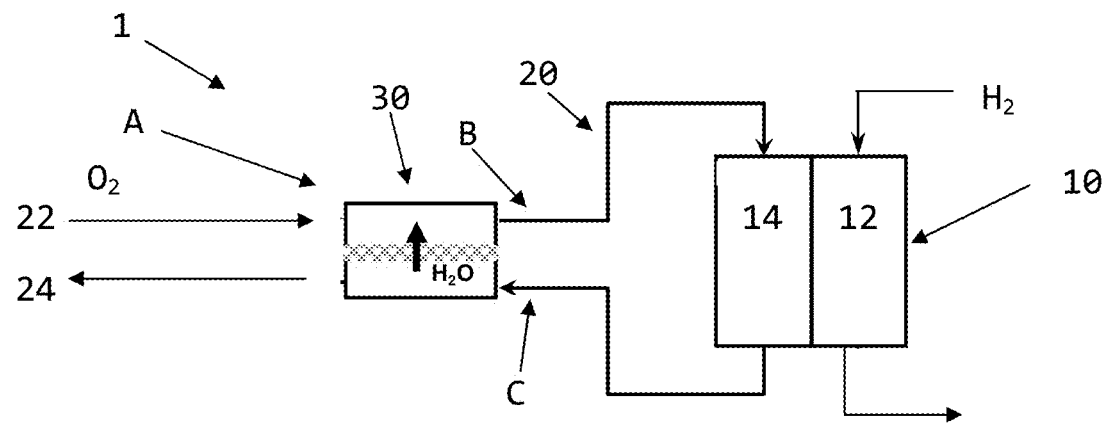
FIG. 1 is schematic showing portions of a fuel cell system with a representative WVT unit arrangement relative to a fuel cell stack.

Referring first to FIG. 1, a fuel cell system 1 made up of a fuel cell stack 10 with numerous individual fuel cells, each of which has an anode 12 and cathode 14, is shown. Various flowpaths are used to convey reactants and their byproducts to and from the respective anode 12 and cathode 14. A WVT unit 30 is fluidly coupled to appropriate portions of flowpath 20 to promote the exchange of humidity between the exhaust 24 and the feed 22. As shown with particularity for the cathode 14, dry air from a compressor (not shown) is fed through feed 22 over a range of pressures and low humidity (typically around 0%) into the WVT unit 30. Likewise, exhaust being discharged from cathode 14 passes through exhaust 24 to the WVT unit 30. The cathode exhaust 24 is at a lower pressure and higher humidity than the air entering the WVT unit 30 on the feed 22 side. Inside the WVT unit 30 is a core made up of numerous wet side and dry side plates which are stacked in an alternating arrangement such that (with the exception of the outermost plates) each plate is sandwiched between plates of the opposing flowpath.

Figure 2:
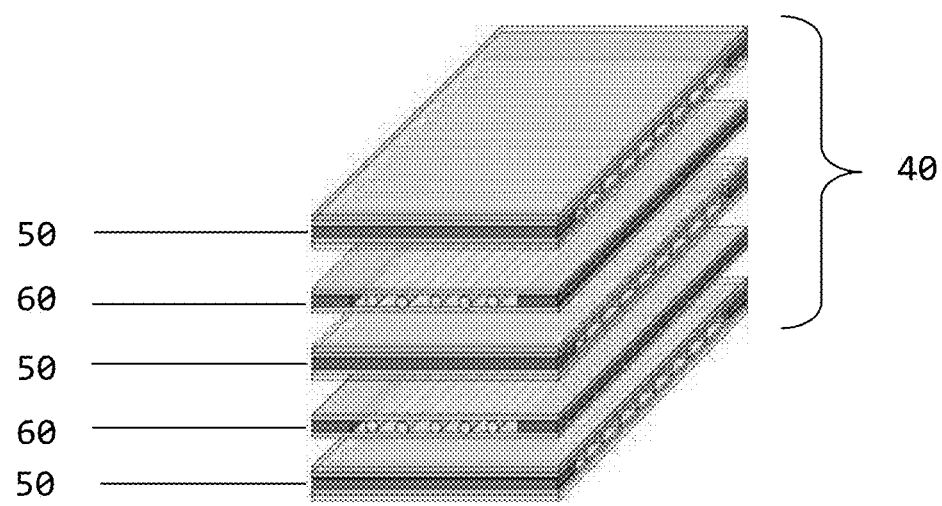
FIG. 2 is an exploded view of an alternating stack of wet side and dry side separator plates for the WVT according to the prior art.

Referring next to FIGS. 2 and 3, details of known separator plates are shown. The core 40 of WVT unit 30 is made up of a stack of plates 50, 60 where one is used as a wet side plate and the other is used as a dry side plate. Each plate 50 and 60 includes a generally planar top and bottom layer made from GDM 52 and 62 respectively. The top and bottom layers 52 and 62 within each of the plates 50 and 60 are spaced from one another to define flow channels 54 and 64 that facilitate the flow of the respective humid exhaust 24 and feed 22 through the plate edges. In one form of the prior art, the channels 54, 64 can be integrally formed as part of the respective plate, while in another, they can be formed separately with ribbon-like (or string-like) structures 66 (shown in representative fashion inside of channel 64 of plate 60) that can be adhered with adhesive 68 (for example, a hot melt adhesive) to the respective diffusion media that makes up an adjacent top or bottom plate surface. It will be understood by those skilled in the art that comparable string and adhesive can be used in the plates 50, and that such string-like structures 66 may define a substantially rectangular profile, a substantially cylindrical profile or any other well-known shape. Edge strips 55 and 65 (only the latter of which is presently shown) are aligned with the flow channels 54 and 64 along their length. The edge strips 55, 65 help provide the spacing that defines the thickness of channels 54 and 64; for example, the height of the wet side channel 64 is defined by the thickness of either the edge strips 65 or the string 66 while the additional thickness of the GDM 62 contributes to overall thickness of plate 60.

The WVT membrane 70 defines a water vapor-permeable barrier between the facing GDM surfaces 52, 62 of adjacently stacked plates 50 and 60. The WVT membranes 70 are made from a material suitable for allowing water transport from the wet side flowpath to the dry side flowpath while simultaneously inhibiting the passage of inlet air that would otherwise pass directly into the exhaust stream without first passing through the fuel cell cathode. As can be seen, a significant portion of the thickness of the plate 60 is defined by the thickness of string 66. In one example, a gap (defined as the thickness between surrounding membranes 70 and made up of the combined thickness of the string 66 and diffusion layers 62 immediately above and below the string 66) is approximately 0.63 millimeters. The thickness of the plates 50 (and the concomitant gap) is also defined largely by the string 66; however, they are less amenable to removal of the channel-defining string 66 or related structure because the plates 50 are subjected to higher loading due to lower internal pressure than the dry side.

Referring next to FIG. 4, a plate assembly 140 according to an aspect of the present invention that makes up a portion of a WVT core includes a plate 160 sandwiched between two plates 150 is shown. In the present context, the term "assembly" is meant to refer to two or more parts being affixed, secured or otherwise connected to one another through fabrication means such that a collection of parts so assembled forms a complete machine, structure, or unit of a machine. As such, assembly 140 may constitute a single plate 150 and a single plate 160 laminated together as shown, as well as a larger laminate or sandwich stack of numerous alternating plates 150, 160 such that the assembly 140 defines some or all of the core of a WVT unit (such as WVT unit 30 shown previously). The plates 150 include an upper and lower diffusion media 152 defining a channel 154 therebetween. Diffusion media 152 may be formed from any conventional material such as a glass fiber, glass-based (or other) paper, carbon fabric or the like. Likewise, the WVT membrane 170 may be any conventional membrane, for example, the PFSA ionomer membrane mentioned above for use in the MEA of a fuel cell, a hydrophilic polymer membrane or a polymer composite membrane. Edge strips 155 (shown in FIG. 5) help to define the generally coextensive flowpath (i.e., flow channel) in a manner generally similar to that depicted in FIG. 2.

Unlike the structure depicted in FIG. 3, the plate 160 contains no diffusion media. A generally planar-shaped region forming a dry side flow channel 164 is defined by membranes 170 that are affixed to corresponding surfaces of the wet side diffusion media 152 of the plate 150, while the wet side flow channel 154 (shown in FIG. 4 as extending between the left and right edges of plates 150) flows along a generally perpendicular path to promote enhanced moisture exchange between the alternating plates 150, 160. The removal of the diffusion media from the plate 160, as well as the use of discrete supports as a way to avoid the use of the reinforcing strings discussed above, allows the assembly 140 to exhibit a lower (i.e., thinner) profile. Such discrete supports significantly reduce the profile of the assembly 140 relative to that of the prior art. Examples of discrete supports are depicted in FIGS. 4 and 5 as dots 151, projections 153, and threads 157. In one non-limiting example, the height of the channel 164 (which coincides with the gap thickness) in the plate 160 is reduced from about 0.63 millimeters to about 0.22 millimeters, representing an approximately 67% reduction in channel 164 thickness when discrete supports are used. In the present context, a discrete support is one that is either discontinuous (for example, in the case of dots 151 and projections 153) or, if continuous, effects such a large reduction in channel thickness (such as that in channel 164 as shown) that the overall profile of the assembly 140 is greatly reduced due to the minimal size of the support (for example threads 157). This removal of the diffusion media and reinforcing strings from the dry side plates is tantamount to a complete removal of the plates 160, the only remaining structure being spacing members (shown in the form of edge strips 165) that are present to define the height in channel 174 mentioned above to allow the flow of dry side fluid therethrough. It has been determined that a continuous reinforcing structure is not required throughout the dry side channel 164 because the pressure of the dry side fluid being introduced into the assembly from a compressor is sufficient to keep the channel 164 from collapsing.

In some embodiments, in order to avoid flutter, to maintain uniform plate spacing, or to avoid related structural problems associated with operation of a WVT unit that includes an assembly 140, discrete supports may optionally be placed in the channel 164 of the plates 160 to take the place of the now-absent string or related reinforcing structure that otherwise would be pressed against the opposite side of the WVT membranes 170. These discrete supports are preferably formed on or to be in contact with the membrane 170. Referring to FIG. 5, one surface of a diffusion media 152 for a plate 150 is shown with the side including various forms of discrete supports to be placed against or on membrane 170, where three different approaches may be used. In a first approach, a repeating pattern of hot melt or cure in place (CIP) dots 151 are applied to the membrane 170 surface. The dots 151 may be applied to the membrane 170 as part of a roll process as will be discussed in more detail below, or could be any material that can be dispensed in liquid or semi-liquid form and then cured. In one form, the dots 151 may be about 200 microns thick. In a second approach, offset heat-formed projections 153 may be formed in the edge strip material along the edges of plate 150 that define the flowpath inlets and outlets; in one form, heated dies could be used to make the projections 153; such projections 153 could be thermoformed into edge strips 155 on the plate 150. The various forms of discrete supports also allow a reduction in the gap between the cells while preventing airflow-induced flutter when the strings or related separator devices are eliminated. As with the dots 151, in one form the edge projections 153 may be about 200 microns thick. It will be appreciated by those skilled in the art that this 200 micron thickness of the dots 151 or the edge projections 153 is significantly less than the approximately 0.50 to 0.60 millimeters thickness of conventional strings such as those shown and described above in conjunction with the prior art. In a third approach, threads 157 may extend from an inlet edge of plate 150 to an outlet edge. When threads 157 are used as discrete supports, their number and diameter (or related thickness dimension) is significantly reduced relative to the strings 66 depicted in the structure of FIG. 3. Such threads 157 may be installed during a stacking process, where they can be heat staked in place using hot melt on the respective inlet and outlet edges. These approaches may be used alone or in combination with one another to achieve the desired degree of discrete reinforcement. In situations where threads 157 are retained, they could (in one form) be attached individually to the plates 160 using an adhesive, while in another be in woven form that can be placed between the plates 160 during the stacking process. Edge strips 155, which extend the length of the plate 150 along its flowpath dimension, may have a hot melt or other adhesive applied to it (such as during the aforementioned roll process) by using a small pressure sensitive adhesive (PSA) dot (not shown). Subsequent reactivation of the hot melt may be relied upon to achieve edge sealing.

Figure 6:
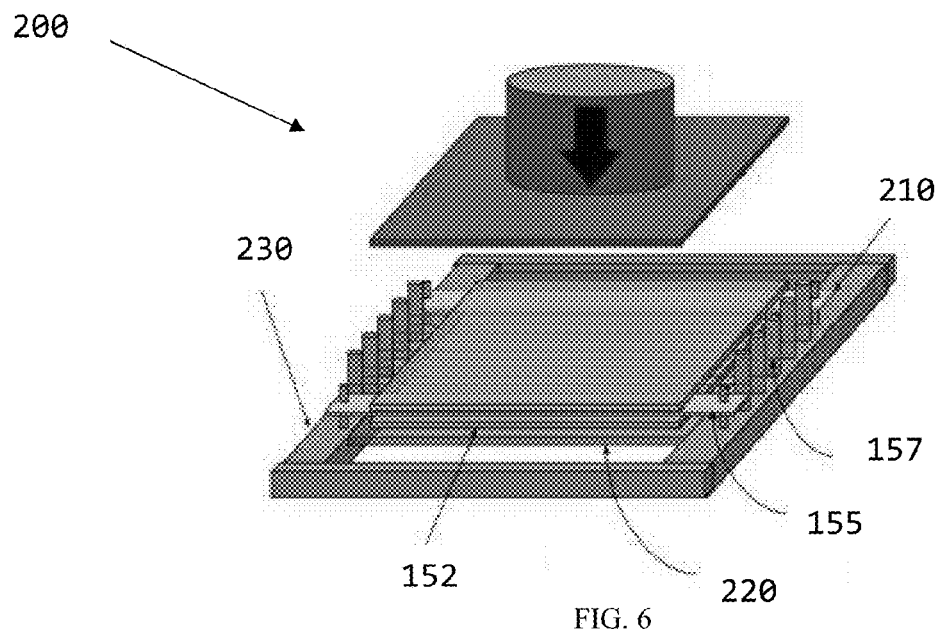
FIG. 6 shows a hot press method of manufacturing the discretely supported wet side plate of the present invention.

Referring next to FIG. 6, a simplified version of a hot press 200 is shown. In such an approach, the hot press 200 includes an upper tool part 210 and a lower tool part 220. The lower tool part 220 can be made to fit within the space defined by a thread-weaving fixture 230 that acts as a frame to hold the lower diffusion media 152 in place while spacing members in the form of edge strips 155 and the above-mentioned threads 157 from the third reinforcement approach discussed above are laid up for attachment to the diffusion media 152 through a hot melt adhesive or the like. In one form, the thread 157 may be made from polypropylene, glass or a related structural material, while the edge strip 155 may be made of a polypropylene that is coated with a hot melt adhesive. Once all of the parts to be assembled are in place within the press 200, the upper tool part 210 is brought toward the lower tool part 220 under significant pressure and temperature to force consolidation of the parts and adhesive. Details associated with the hot press approach are discussed in the previously-mentioned published application to Skala.

Figure 7:
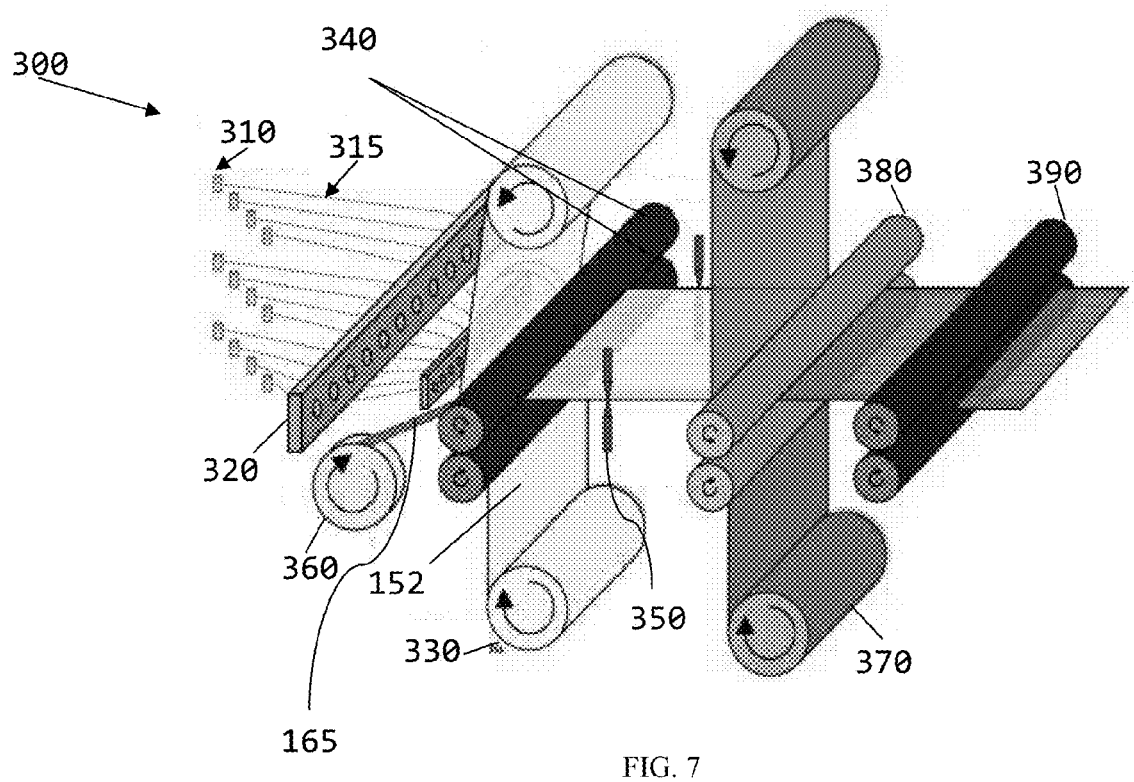
FIG. 7 shows a simplified view of a roll-based method of manufacturing the discretely supported wet side plate of the present invention.

In one form, the plates 150 may be manufactured in a rolled process with membrane 170 attached to or otherwise adjacent with both sides of the plate 150 that is formed by the diffusion media 152. Referring next to FIG. 7, a more automated roll process 300 is shown using as an example threads 315. As will be appreciated by those skilled in the art, automated roll process 300 may be adapted to use dots 151 or other discrete supports as shown in FIG. 5. Unlike the hot press 200 discussed above, the roll process 300 takes advantage of continuous production of plate 150 through roller-based paper station 335 and membrane station 375. The configuration of the paper station 335 and membrane station 375 is such that one or a series of rollers in succession may be used to achieve the desired degree of laminate formation. Spools 310 of thread 315 or other related reinforcement (which, as mentioned above, may be coated with adhesive, if desired) are routed from a creel through an alignment tool 320 such that they are introduced as a generally planar array of threads 315 between layers of wet side diffusion media 152 that are being fed from opposing rollers 330. The diffusion media 152 may be preheated before consolidation with the reinforcing threads 315, if desired. Suitable preheating methods include, but are not limited to, heated rollers, and infrared means. The edge strip 165, which is fed from roll 360, is introduced between the upper and lower diffusion media layers 152 along their lateral edges. As with the threads 315, the edge strip 165 may be coated with an adhesive, if desired. The upper diffusion media 152/thread 315/edge strip 165/lower diffusion media 152 laminate is then solidified by passing them through heated rollers 340 such that the adhesive (if present) cures them. Rollers 340 can be made of or treated with silicone, if desired, to facilitate release of the upper and lower diffusion media 152 from their respective feed rollers once the diffusion media 152 has been joined to the thread 315 or edge strip 165.

Hot melt on the surface of the diffusion media 152 is reheated and used to bond the membrane 170 that comes off of roll 370. If needed, additional adhesive is applied at station 350 upstream of a membrane station 375. An optional cooling station (not shown) may be included between the paper station 335 and membrane station 375 to speed up the curing process of the laminate. Membrane station 375 is configured in a generally similar manner to that of paper station 335 in that it places a layer of membrane 170 from roll 370 on the outer surfaces of the diffusion media 152 that make up the laminate. Likewise, compression rollers 380 force the membrane 170 onto the adhesive for a secure assembly. An additional cooling station (not shown) may be included for more rapid curing of the adhesive, whether from adhesive station 350 or elsewhere. Downstream of that, a printhead and cutting station (neither of which are shown, the latter in exemplary the form as cut rollers) can be used to cut the assembled laminate to a desired length. From there, the laminate can be die cut at die cut station (not shown) into a separator plate shape. As such, parts can be blanked using dies, laser, waterjet or the like. Additional steps, include stacking the various plates into a core or related packaging, may be employed. Likewise, a dispensing station may be used to the line and place plate-to-plate adhesive on the parts for inline stacking after they are cut to length.

Referring with particularity to FIGS. 8A through 8H, various manipulation and stacking approaches of a continuous roll 400 of laminate may also be used. In one form, such manipulation includes scoring 405 (FIG. 8B) and Z-folding (FIGS. 8C through 8E) the continuous laminate 400; such an approach is roughly analogous to that used in rolls of raffle (or related gaming) tickets. Edge strips 155, 165 as discussed above could be added at the scores 405 (to create the dry flow field), while the roll 400 would be pleated until the number of cells is reached and then cut to create one complete WVT core. This approach could significantly reduce the core part count; in one example of a WVT sized for automotive applications, such an approach could reduce part count by about 3,500. Such an approach could also lead to the use of the aforementioned discrete thread adhesive, which in turn could lead to an even more porous diffusion media 152. In particular, because the Z-folded stack 500 would now employ a series of continuous threads such as those shown in the process in FIG. 7, intermittent hot melt application could be used instead of continuous hot melt coated thread, thereby reducing the amount of diffusion media 152 impregnated with hot melt, which in turn would decrease transfer resistance in the diffusion media 152 as it proceeds along its production path.

A cutting station (not shown) could score both the top and bottom of the plate 150 of roll 400 to create the wet stream flow path. Once enough folds are placed in the plate 150, an accordion-shaped series of folds (FIGS. 8E through 8G) could be enabled. In addition to a traditional blade, other approaches could be used. In one particular form, a laser set to an appropriate power level could be used.

Figure 8A:
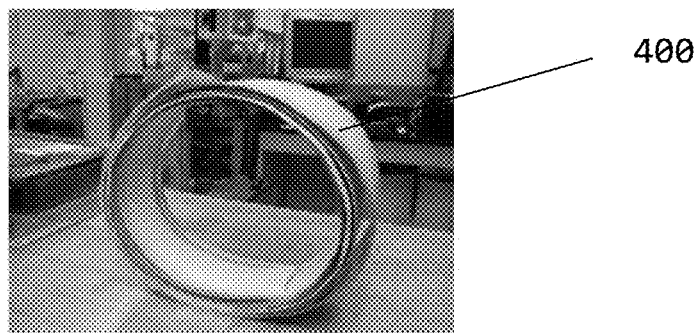
FIGS. 8A through 8H show various steps of forming discretely supported WVT separator plate assemblies from the roll process of FIG. 7.
Figure 8B:
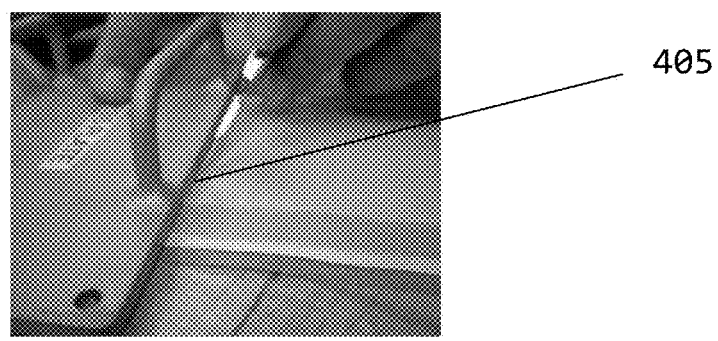
Figure 8C:
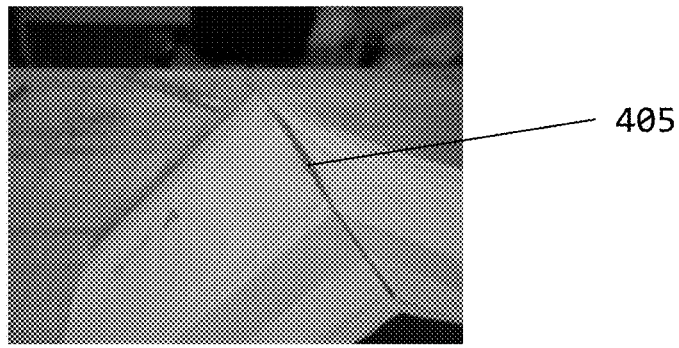
Figure 8D:
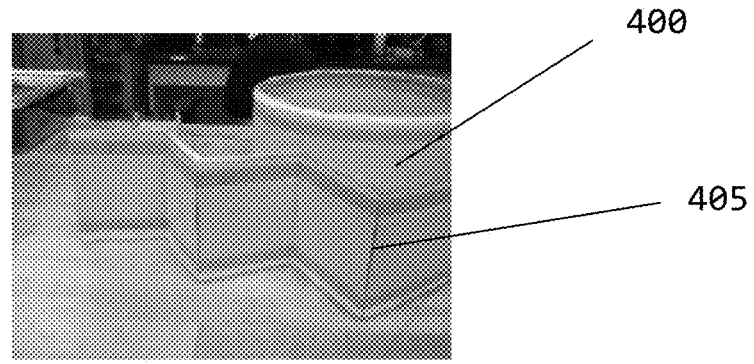
Figure 8E:
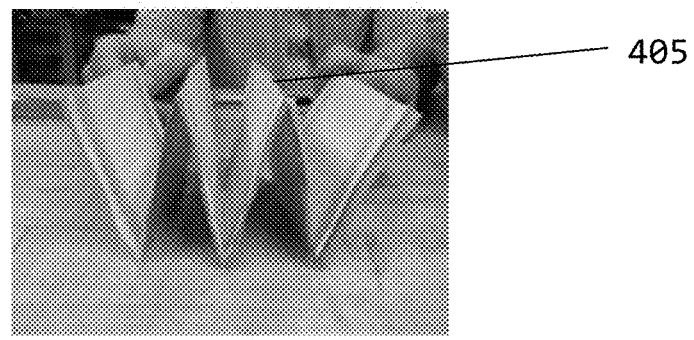
Figure 8F:
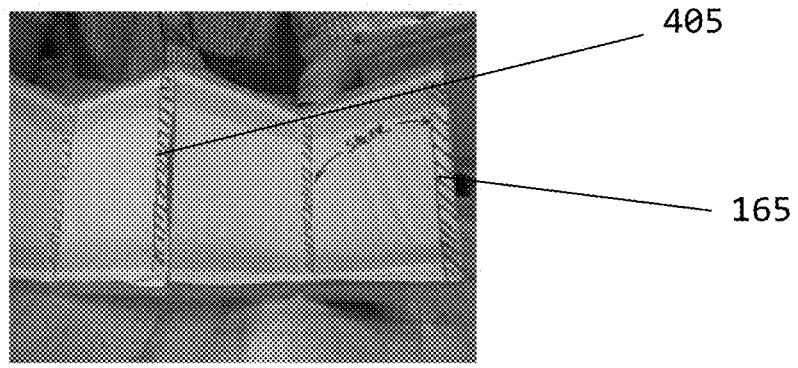
Figure 8G:
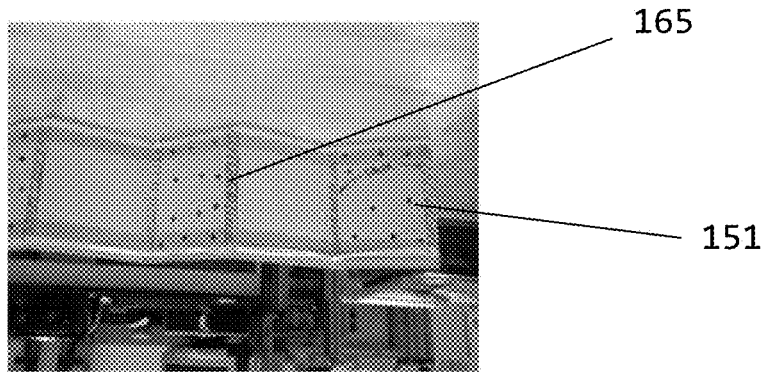
Figure 8H:
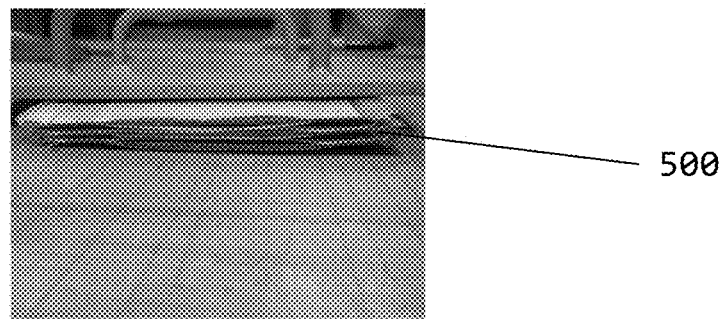

As shown with particularity in FIGS. 8F and 8G, some spacing members or related support could be added to the scored plate 150. In addition to creating the spacing required between adjacent cells as they get folded, these spacing members (such as the aforementioned dots 151, projections (or pips) 153, and continuous threads 157 from FIG. 5 above, as well as edge strips 155) are useful in avoiding flutter and related problems. Also as discussed above, it is believed that a certain spacing (for example, about 200 microns) between the cells will be beneficial to allow the dry air to flow between adjacently-facing cells. Once the spacers and supports are added, the various portions of the plate 150 are folded along pleats that are adjacent the scoring to build up the assembly, as shown in FIG. 8H to produce a Z-folded stack 500. The spacing mentioned above, while not necessarily a minimum, may be sized to produce a desired pressure drop for fluid as it flows through the channel. In one exemplary form, the spacing is 600 microns, including a 400 micron channel and two layers of 100 micron diffusion media 152.

While certain representative embodiments and details have been shown for purposes of illustrating the invention, it will be apparent to those skilled in the art that various changes may be made without departing from the scope of the invention, which is defined in the appended claims.

What is claimed is:

1. A water vapor separator plate assembly comprising:
a pair of wet side separator plates each defining a wet side flow channel region therein;
a pair of water vapor transfer membranes disposed on respective surfaces of the pair of wet side separator plates such that a generally planar dry side flow channel region is formed therebetween;
at least one discrete support positioned within the dry side flow channel region, wherein the discrete support is selected from the group consisting of a dot, projection, thread and combinations thereof;
at least one spacing member positioned between and disposed on respective surfaces of the pair of water vapor transfer membranes such that-the dry side flow channel region possesses a thickness defined substantially by the at least one spacing member is formed; and
wherein the height of the dry side flow channel region is about 0.22 millimeters.

2. The assembly of claim 1, wherein the wet side flow channel regions have a substantially perpendicular flow to that of the adjacent dry side flow channel region.

3. The assembly of claim 2, wherein the wet side flow channel region is formed by at least one of thread arranged along the pair of spaced apart diffusion media.

4. The assembly of claim 1, wherein the at least one spacing member comprises at least one edge strip.

5. The assembly of claim 1, wherein the at least one discrete support positioned within the dry side flow channel region is a dot.

6. The assembly of claim 1, wherein the at least one discrete support positioned within the dry side flow channel region is a projection.

7. The assembly of claim 1, wherein the at least one discrete support positioned within the dry side flow channel is a thread.

8. The assembly of claim 5, wherein the dot is a material selected from the group consisting of cure-in-place adhesive and pressure-sensitive adhesive-backed spacer material.

9. The assembly of claim 6, wherein the projection is made from thermo-formed edge strip material.

10. The assembly of claim 7, wherein thread is a material selected from the group consisting of plastic, dispensed adhesive and glass.

* * * * *